United States Patent [19]

Brooks et al.

[11] Patent Number: 5,119,633
[45] Date of Patent: Jun. 9, 1992

[54] POWER TURBINE BYPASS FOR IMPROVED COMPRESSION BRAKING

[75] Inventors: Robert M. Brooks; Timothy P. Lutz; John Stang, all of Columbus, Ind.

[73] Assignee: Cummins Engine Company, Inc., Columbus, Ind.

[21] Appl. No.: 587,733

[22] Filed: Sep. 25, 1990

[51] Int. Cl.⁵ .............................................. F02G 5/00
[52] U.S. Cl. ....................................... 60/624; 60/602
[58] Field of Search ................ 60/600, 601, 602, 603, 60/624

[56] References Cited

U.S. PATENT DOCUMENTS

| | | | |
|---|---|---|---|
| 4,391,098 | 7/1983 | Kosuge . | |
| 4,395,884 | 8/1983 | Price | 60/602 |
| 4,452,043 | 6/1984 | Wallace . | |
| 4,474,006 | 10/1984 | Price et al. | 60/602 |
| 4,748,812 | 6/1988 | Okada et al. . | |
| 4,800,726 | 1/1989 | Okada et al. . | |
| 4,843,822 | 7/1989 | Okada . | |
| 4,858,440 | 8/1989 | Okada . | |
| 4,882,906 | 11/1989 | Sekiyama et al. | 60/624 |
| 4,897,998 | 2/1990 | Sekiyama et al. . | |

FOREIGN PATENT DOCUMENTS

157941 10/1960 Japan .
105233 10/1988 Japan .

Primary Examiner—Michael Koczo
Attorney, Agent, or Firm—Sixbey, Friedman, Leedom & Ferguson

[57] ABSTRACT

A turbocompound engine having a power turbine bypass valve and a control module for controlling opening and closing of the bypass valve. The turbocompound engine is capable of operating in a compression braking mode, and the control module opens the bypass valve in response to actuation of the compression braking, resulting in improved braking.

14 Claims, 6 Drawing Sheets

POWER TURBINE BYPASS FOR IMPROVED COMPRESSION BRAKING

TECHNICAL FIELD

The invention relates to turbocompound engines, and more particularly to a power turbine bypass control for a turbocompound engine.

BACKGROUND OF THE INVENTION

A standard turbocompound engine includes a turbocharged diesel engine with a power turbine placed downstream of the turbine of the turbocharger. The power turbine recovers exhaust energy and transmits power to the engine output shaft, to which the turbine is coupled by a gear train.

Due to the tremendous amount of braking power required to stop over-the-road trucks, it is constantly a goal to provide improved braking systems. For many internal combustion engine applications, it is highly desirable to operate the engine in a braking mode. One well-known approach, as illustrated in U.S. Pat. No. 3,220,932 which is incorporated herein by reference, has been to convert the engine into a compressor by cutting off the fuel flow and opening the exhaust valve for each cylinder near the end of the compression stroke and to close the exhaust valve shortly thereafter; thus permitting the conversion of kinetic inertial energy of a vehicle to compressed gas energy which may be released to the atmosphere when the cylinder exhaust valves are opened (this form of engine braking is hereinafter referred to as compression braking). When the compression brake is actuated, the engine is prevented from providing positive work to the drive shaft, since gas from the cylinder is expelled through the exhaust valve as the piston completes its compression stroke. Thus, since the fuel flow is cut off and the compressed gas is expelled, no power is transmitted to return the piston on an expansion stroke, but rather, power from the drive shaft is absorbed as the engine acts as a compressor, receiving air from the intake manifold and expelling the compressed gas at the end of each compression stroke.

In compression braking, the power that can be absorbed is related to the air mass flow through the engine, i.e., higher air flow provides higher braking capability. However, during compression braking in a turbocompound engine, the power turbine limits airflow and places a backpressure on the turbocharger turbine. As a result, the pressure drop across the turbocharger turbine is reduced. Since the amount of work produced by the turbocharger in the form of compressed air is related to the pressure drop, when the pressure drop is reduced, the air mass flow provided by the turbocharger is inhibited. In addition, the power turbine contributes power to the engine output shaft which offsets gains in braking power.

Exhaust valving systems which attempt to provide more favorable exhaust pressures for various operating or braking conditions are known. For example, U.S. Pat. No. 4,391,098 to Kosuge discloses a turbocompound engine in which first and second waste gates are provided to control the supercharging pressure and the pressure fed to an auxiliary (power) turbine. The waste gates include pressure sensitive valves which open when the pressure is sufficient to overcome the bias of a spring plus atmospheric pressure. In operation, the first waste gate is opened when the supercharging pressure reaches a predetermined level, and bypasses a portion of the engine exhaust past the turbocharger turbine to the auxiliary turbine. When the engine operates at high speed, high load, the second waste gate is opened by passing at least a portion of the exhaust gases past the auxiliary turbine. However, Kosuge does not provide improved exhaust conditions for increasing the effectiveness of compression braking. The Kosuge arrangement merely provides relief valves to relieve pressures above a predetermined limit.

Japanese Utility Model Laid Open No. 157,941/85 discloses a turbocompound engine in which a power turbine bypass is actuated in response to depression of the accelerator pedal. This arrangement also does not address the problems associated with compression braking in a turbocompound engine.

U.S. Pat. Nos. 4,748,812 and 4,800,726 to Okada et al. disclose turbocompound engines in which the exhaust leading to the auxiliary turbine is blocked during exhaust braking and the auxiliary turbine is utilized as a compressor driven by the engine crankshaft. In this arrangement, the blockage of the exhaust results in high energy back pressure which acts as an engine brake force by increasing the pumping work of the engine. This arrangement is unsuitable for compression braking, since the actuation of the valve upstream of the power turbine closes the exhaust flow passage which diminishes the effectiveness of a compression brake as the inhibited airflow diminishes the ability of the engine to convert kinetic inertial energy of the vehicle to compressed gas energy.

SUMMARY OF THE INVENTION

It is, therefore, an object of the present invention to overcome the shortcomings of the prior art by providing a turbocompound engine having an improved power turbine bypass valve control.

It is another object of the invention to provide a turbocompound engine having improved compression braking. In compression braking, the power that can be absorbed is related to the air mass flow through the engine with other conditions remaining constant. In addition, the airflow is related to the intake manifold pressure, or boost, since a higher intake manifold pressure corresponds to a higher density of air, providing higher mass flow. The boost is generated by the turbocharger which utilizes a turbine to extract energy from the air released from a cylinder to drive a compressor. The amount of energy extracted by the turbine is a function of the pressure drop across the turbine, or more particularly, the ratio of the turbocharger turbine inlet pressure to the turbocharger turbine exit pressure.

A turbocompound engine utilizes a smaller turbocharger turbine than that of a standard turbocharged engine. The smaller turbocharger turbine thus has a smaller swallowing capacity, which increases the pressure at the inlet of the turbocharger turbine. As a result, a larger pressure ratio can be created across the smaller turbine in a turbocompound engine, as compared to a conventional turbocharger turbine in a standard turbocharged engine. However, in a turbocompound engine, the power turbine increases the turbocharger turbine exit pressure reducing the pressure ratio and, consequently, the boost generated by the turbocharger. By opening a bypass valve around the power turbine during compression braking, the air mass flow is increased and the power contribution of the power turbine is reduced, resulting in a significant increase in braking power. The braking power is increased even above that achieved by a standard turbocharged engine operating in a compression braking mode. Thus, the present invention utilizes a power turbine bypass in conditions not previously recognized as beneficial, i.e., during compression braking.

The above as well as other objects and advantages are achieved by the present invention in which a turbocompound engine is provided with a power turbine bypass valve and a control module which opens the bypass valve when the engine operates in a compression braking mode.

DESCRIPTION OF THE PREFERRED EMBODIMENT

Figure 2:
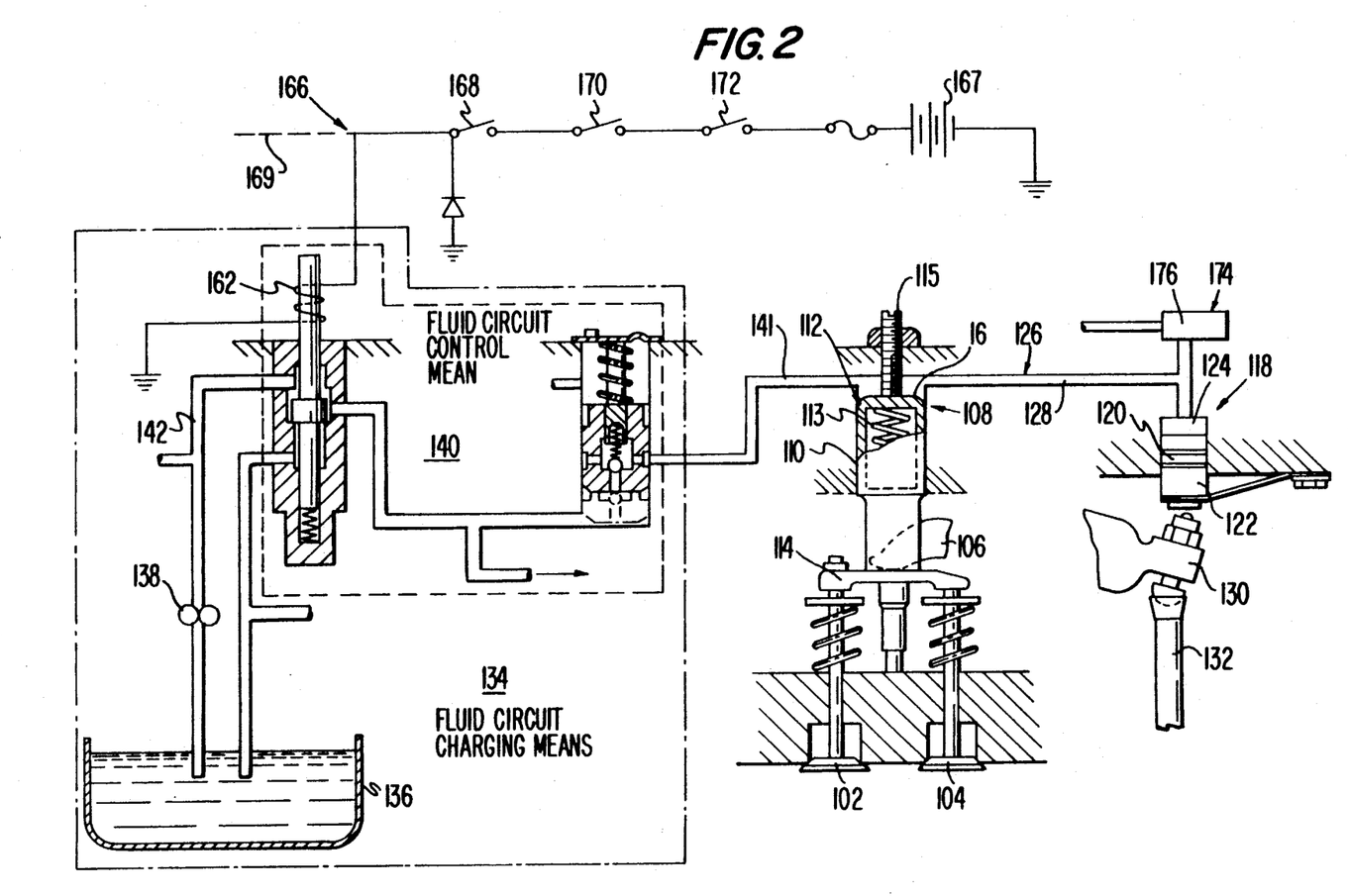
FIG. 2 shows a known device for operating an engine in a compression braking mode.

FIG. 2 shows a device as disclosed in U.S. Pat. No. 4,150,640 which is incorporated herein by reference for hydraulically controlled compression braking of an internal combustion engine. A pair of exhaust valves 102, 104 are associated with a piston for simultaneous operation by an exhaust rocker lever 106 during normal power operation of the engine. During normal operation, lever 106 is connected in a valve train to a rotating cam which is designed to leave the exhaust valves closed during the compression and expansion strokes of the associated piston. However, during compression braking, a hydraulic system is provided to at least partially open the exhaust valves near the end of the compression stroke of the associated piston.

The system of FIG. 2 includes actuating means 108 in the form of a cylinder 110 and hydraulically actuated slave piston 112, which are mechanically connected to exhaust valves 102 and 104 by a bridging element 114, such that the valves 102, 104 are at least partially open when the cylinder cavity 116 above slave piston 112 is pressurized by fluid. At all other times, slave piston 112 is biased by spring 113 into a retracted position as shown in FIG. 2. An adjusting screw 115 may be provided to permit adjustment of the fully retracted position of the slave piston 112.

The cavity 116 of the actuating means 108 is fluidly connected with a fluid pressurizing device 118. The pressurizing device 118 includes a cylinder 120 and master piston 122 slidingly mounted within cylinder 120 forming a cavity 124 above the piston 122. The cylinder 120 communicates with cavity 116 through a fluid circuit 126 which includes fluid conduit 128.

Piston 122 may be displaced by any element within the engine which is displaced during periodic intervals and properly timed with respect to the desired opening times of exhaust valves 102 and 104 (i.e., at the end of the compression stroke). FIG. 2 shows piston 122 displaceable by a fuel injector valve rocker arm 130 and injector push rod 132 which are present in engines equipped with cam actuated fuel injection systems. The use of the fuel injector actuating mechanism to displace the master piston is particularly suitable in a cam actuated fuel injection system since the fuel injector valve associated with each engine cylinder is timed to be displaced near the end of the compression stroke of the piston within the associated cylinder. Thus, fluid conduit 128 which connects the fluid pressurizing device 118 and the actuating device 108 may be quite short, with a short system response.

A valve opening delay device 174 may also be provided for preventing opening of the exhaust valves upon pressurization of the incompressible fluid. The valve delay opening device 174 includes a fluid pressure control valve 176 connected with fluid conduit 128 for venting fluid from the conduit whenever the pressure within the conduit reaches a predetermined level which, if exceeded, would cause the slave piston to overcome the closing bias of the exhaust valve. In order to activate the braking system, the fluid conduit 128 is charged with a supply of incompressible fluid, such as engine lubricating oil, by a fluid circuit charging device 34, encompassed within the dot-dashed line of FIG. 2. The charging device includes a pump or crankcase 136, a fluid pump such as a lubrication oil pump 138 and a fluid control circuit device 140 for receiving fluid from pump 138 through conduit 142 and supplying the fluid to fluid circuit 126 through conduit 141.

The electrical control circuit 166 includes a plurality of switches connected in series between a battery 167 and a solenoid 162 such that all switches must be closed in order for the solenoid 162 to be energized and the compression braking system placed in operation. Fuel pump switch 168 is included to insure that the braking mode is only possible when the engine fuel pump has been turned off. Thus, switch 168 closes only when the fuel pump is returned to the "off" position. A clutch switch 170 is provided so that the engine may only be operated when the clutch is engaged, thereby insuring that the braking effect of the engine is absorbing energy from the driveshaft and vehicle wheels. In addition, a dash switch 172 is provided to permit the vehicle operator to determine the point at which the braking effect is desired by actuation of the switch 172.

Figure 1:
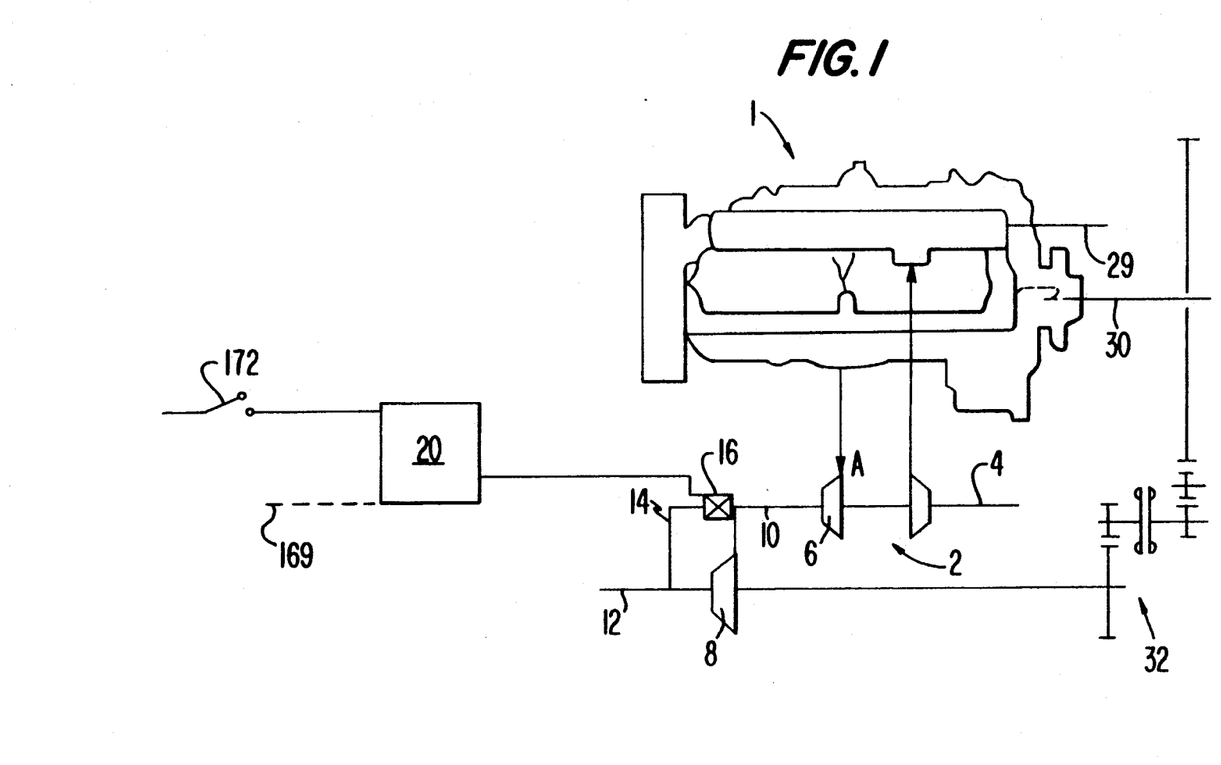
FIG. 1 is a schematic of a turbocompound engine having a controlled power turbine bypass valve.

As shown in FIG. 1, the present invention includes a turbocompound engine 1 which is operable in a compression braking mode. For clarity, elements of the compression braking device are omitted from FIG. 1. Turbocharger 2 receives ambient air from an inlet 4, and feeds compressed air to the engine through intake manifold 3. Exhaust from the engine, flowing in the direction shown by arrow A, drives a supercharger turbine 6. Downstream of the turbocharger turbine, a power turbine 8 extracts further energy from the exhaust flowing in interstage duct or passage 10. The power turbine is geared to the engine crankshaft 30 by gear train 32 to increase the engine output power. The exhaust then exits to the atmosphere via exhaust passage 12.

A bypass passage 14 is also provided connecting the interstage passage 10 and exit exhaust 12. Valve 16 is provided, such that when the valve is opened, exhaust gases proceed directly to exhaust passage 12, bypassing the power turbine. The valve 16 may be an on-off valve or may be of a variable opening type where it is desired to bypass only a portion of the exhaust gases.

The turbocharger in a turbocompound engine has a turbine casing which is approximately 50-60 per cent of the size of the turbine casing on a conventional turbocharged engine since turbocompound engines operate at higher pressure levels and hence higher air densities. The turbocharger turbine casing has a smaller swallowing capacity and thus the pressure at the turbo turbine inlet is increased. Since the power that can be absorbed by a compression brake is related to the air mass flow through the engine, it is desirable to make the pressure ratio across the turbocharger turbine as large as possible. When the power turbine is bypassed, a greater pressure differential across the turbocharger turbine is created, causing an increase in the intake manifold pressure. Since a turbocompound engine utilizes a smaller turbocharger turbine than a standard turbocharged engine, the pressure ratio is larger (than that of a standard turbocharged engine) and braking power exceeding that of a standard turbocharged engine is achieved. Thus as a result of bypassing the power turbine during compression braking, braking power is increased, allowing the engine to operate more effectively in a compression braking mode.

Control module 20 controls opening and closing of the bypass valve in response to the actuation of the brake switch 172. If desired, the bypass valve may also be controlled to open during normal braking (thereby eliminating the power contribution of the power turbine) in addition to compression braking. The control module 20 actuates the bypass as a result of the signal from switch 172 indicative of compression brake actuation. The control module may also open the bypass only if all three switches associated with compression braking (as shown at 168, 170 and 172 in FIG. 2) are closed if desired. This may be accomplished, for example, by providing a signal to the controller 20 when all switches 168, 170, 172 are closed as represented by the broken line 169, FIGS. 1 and 2.

The results of a computer simulation comparing compression braking in a standard turbocharged engine, a turbocompound engine without a bypass, and a turbocompound engine with the power turbine bypassed are as follows:

|  | Turbocharged | Turbocompound Without Bypass | Turbocompound With Bypass |
| --- | --- | --- | --- |
| Braking Power (HP) | 259 | 280 | 330 |
| Intake Manifold Pressure (psia) | 32.2 | 37.1 | 46.6 |
| Air Mass Flow (lb./min.) | 52.6 | 50.9 | 61.0 |

As demonstrated above, the turbocompound engine with the power turbine bypassed provides a pressure differential across the engine pressure and air mass flow which is greater than both the non-bypassed turbocompound engine and the standard turbocharged engine during compression braking. As a result, braking power is increased by almost 20% over the nonbypassed turbocompound engine and by more than 25% over the standard turbocharged engine. The turbocompound engine without a bypass operates at a higher pressure differential than the turbocharged engine. This greater pressure differential reduces the air mass flow but also increases the pumping work done by the engine. The net result is an increase in braking power when compared to the turbocharged engine. With the power turbine bypassed, the braking power is increased beyond that of a non-bypassed turbocompound as well as a standard turbocharged engine. Thus, in accordance with the present invention the use of a power turbine bypass during compression braking achieves improved braking power in a manner not heretofore realized.

In the above embodiment, the bypass valve may be an on-off, or variable type. However, a variable opening valve may be preferred to provide an adjustable bypass if desired for other operating conditions. Of course, even where a variable valve is used, the valve would generally be fully opened during compression braking. The use of a variable valve may be advantageous where it is desired to pass a portion of the exhaust gas toward the power turbine, for example, to prevent overheating.

Figure 3A:
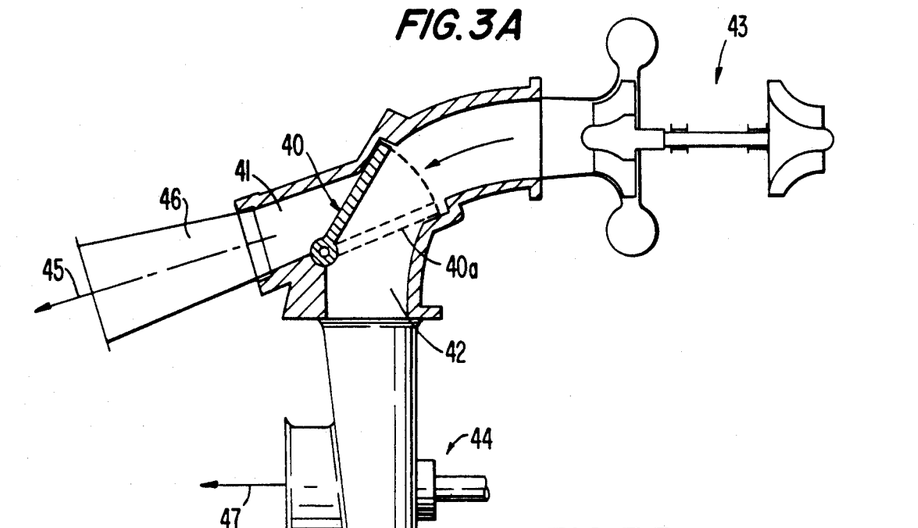
FIGS. 3A-3E show various bypass valve arrangements for bypassing the power turbine in accordance with the present invention.
Figure 3B:
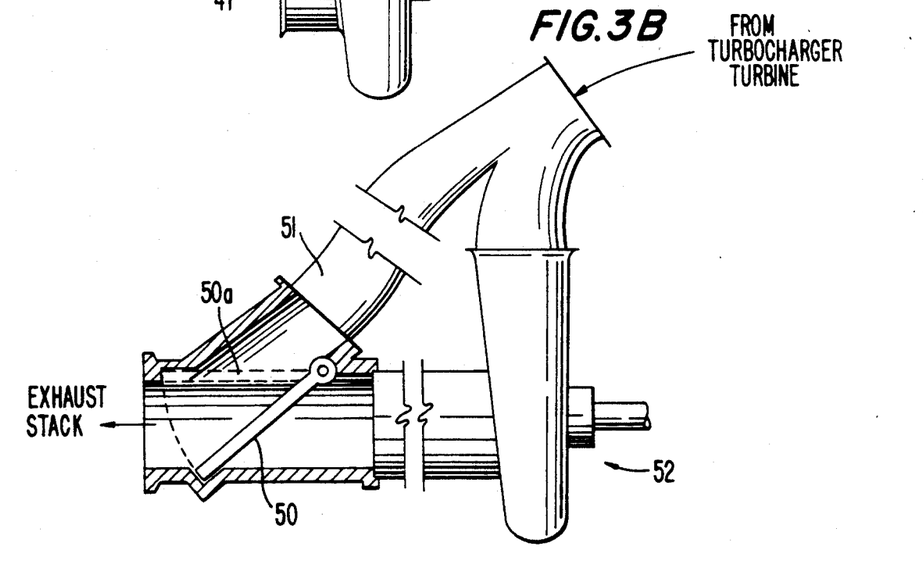

FIGS. 3A-E show examples of bypass valves that can be used to bypass the power turbine. It is to be understood that other bypass valve arrangements may also be utilized without departing from the scope of the present invention. FIGS. 3A-B illustrate respectively upstream and downstream flapper-type valves. In the upstream (FIG. 3A) arrangement, a gate or flapper 40 is provided at the junction of the bypass passage 41 and the passage 42 to the power turbine. The position illustrated represents the bypass closed position with the open position indicated by broken lines 40a. In the open position, exhaust gas from the turbocharger 43 are blocked from the power turbine 44 and pass to the exhaust stack as indicated at arrow 45. In the closed position, exhaust gas flows through the power turbine prior to exiting through the exhaust stack, as indicated at 47. Optionally, a diffuser 46 may be provided to further reduce the back pressure on the turbocharger turbine when the valve is in the open position.

FIG. 3B shows a downstream flapper arrangement in which flow through the power turbine is prevented by blocking the power turbine 52 outlet, as shown at 50 (bypass open). In the closed position 50a, the bypass duct is closed, causing the exhaust gas to flow through the power turbine.

Figure 3C:
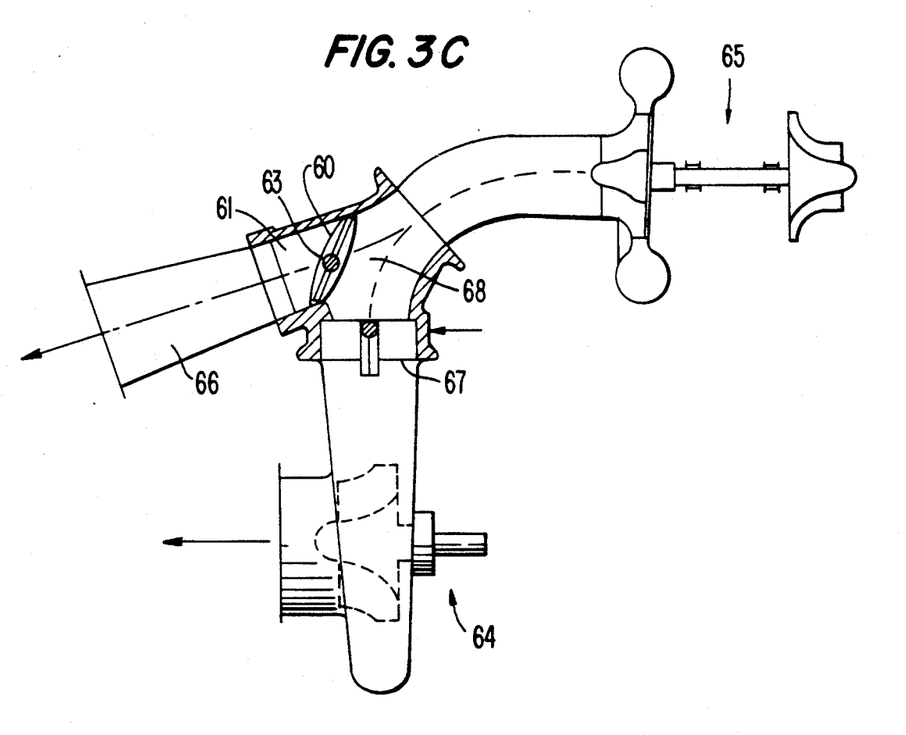

In FIG. 3C, a butterfly valve is provided in which diverter 60 blocks flow through the bypass duct 61 in the closed position. The diverter pivots at 63 into the open position to allow flow through the bypass duct 61. In the open position, flow through the power turbine is not blocked; however, only a small amount of gas passed through the power turbine as the gas follows a path of least resistance and backpressure on the turbocharger turbine is relieved. An optional diffuser is shown at 66 to further improve flow through the bypass duct. In addition, an anti-backflow check valve 67 is provided at the power turbine inlet. The check valve prevents backflow which may result if the pressure at the power turbine inlet exceeds the pressure at the intersection 68, for example, just after the bypass has been opened.

Figure 3D:
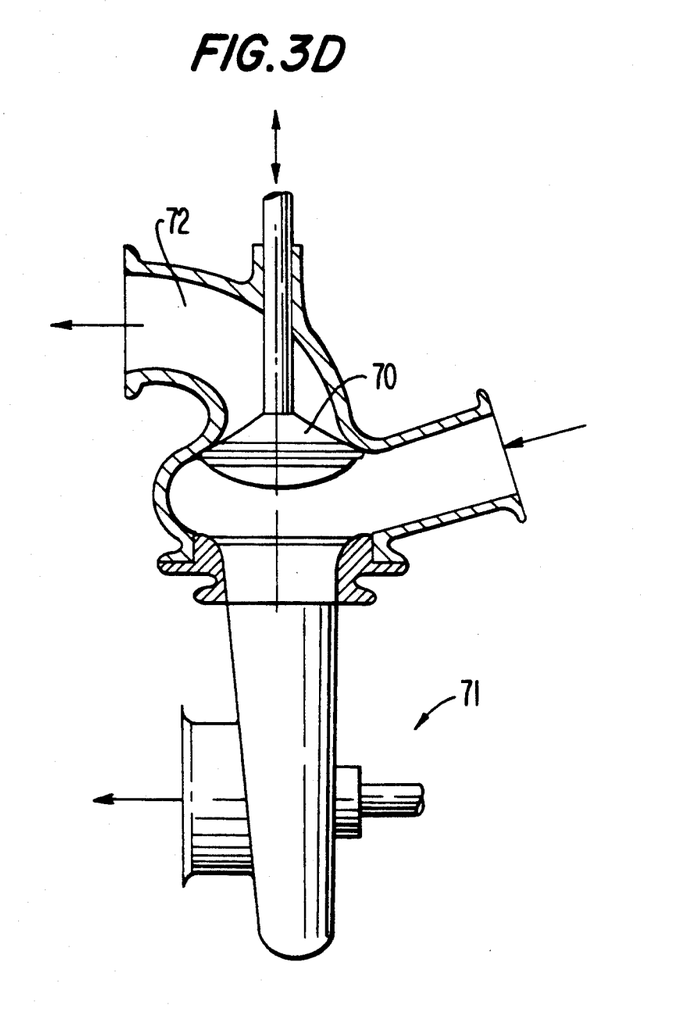

FIG. 3D shows a poppet valve in the bypass closed position. For the bypass open position, the valve 70 is actuated fluidically or by a spring to move downwardly and close the inlet to the power turbine while simultaneously opening the inlet to the bypass duct. As with the valves in FIGS. 3A-C, the valve may be operated to a partially open position, so that a small portion of the exhaust gas passes through the power turbine. This is particularly useful where overheating of the power turbine is a problem.

Figure 3E:
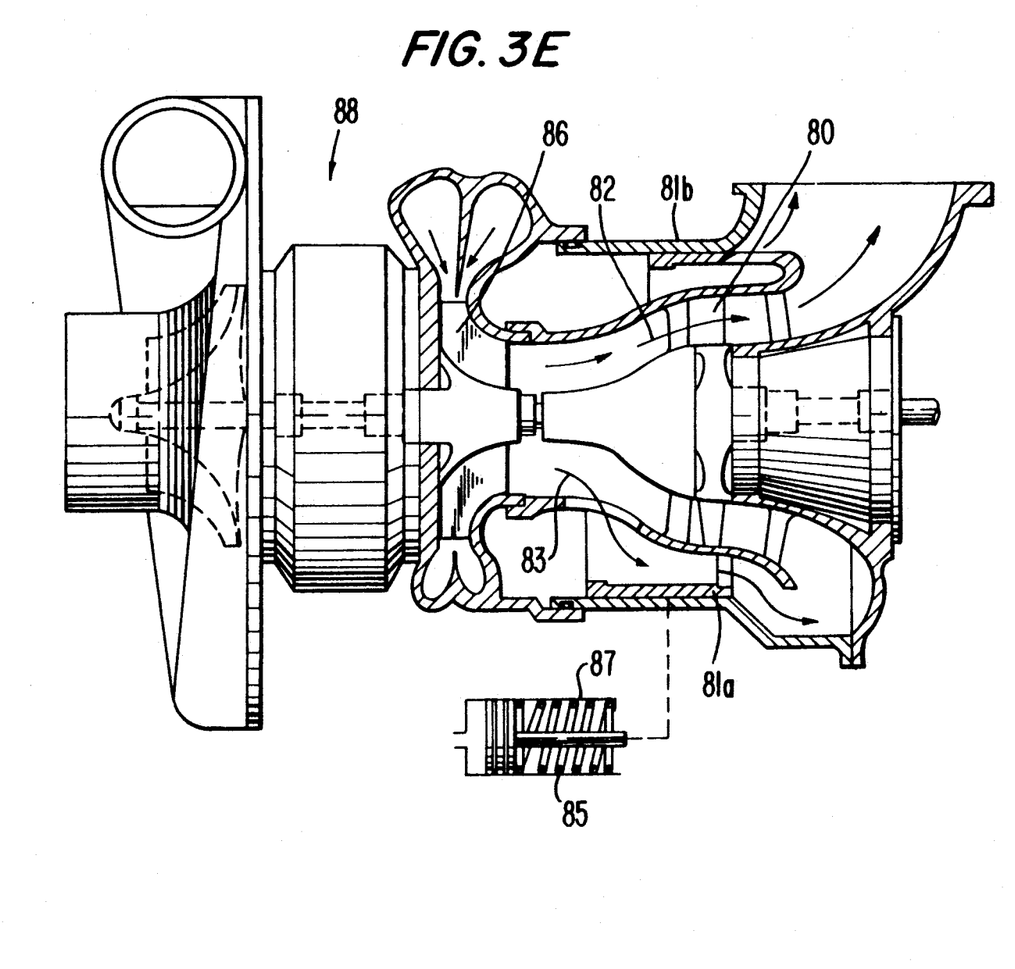

FIG. 3E shows an axial power turbine 80 with a translating shroud bypass 81a, 81b. For illustrative purposes, the upper portion of the shroud is shown in the bypass closed position at 81b, while the lower portion of the shroud 81a is shown in the bypass open position. It is to be understood, however, that the entire shroud moves together as a unit between the open and closed positions. In the closed position 81b, all of the exhaust gas flows through the power turbine as indicated by arrows 82. In the open position 81a, most of the exhaust gas bypasses the power turbine as indicated by arrows 83. When it is desired to relieve backpressure on the turbocharger turbine 86, fluid cylinder 85 moves the shroud to the open position. The cylinder may be operated pneumatically (for example, by compressed air generated from the turbocharger 88) or hydraulically. Bias means are provided to return the shroud to the closed position in which all gas flows through the power turbine. It is understood that the cylinder may also be biased in the shroud bypass open position and fluidically actuated to move the shroud into the closed position.

Industrial Applicability

The bypass control, as described above, thus provides for improved braking power and, more particularly, for improved compression braking in a turbocompound engine.

We claim:

1. A turbocompound engine having a power turbine bypass control comprising:
    an internal combustion engine having a crankshaft, an intake manifold and an exhaust manifold;
    turbocharger means connected with said intake and exhaust manifolds for converting exhaust gas energy into mechanical energy for boosting intake air pressure, said turbocharger means including a first turbine connected to said exhaust manifold;
    power turbine means for producing mechanical energy from energy remaining in the exhaust gases exiting said first turbine, said power turbine means being coupled to the crankshaft of said engine for providing power to said crankshaft;
    exhaust passage means for allowing exhaust gas to bypass said power turbine, said exhaust passage means including a bypass passage and a bypass valve wherein exhaust gas from said engine passes through said power turbine means when said bypass is in a closed position and at least some of the engine exhaust gas passes through said passage to bypass said power turbine means when said bypass valve is in an open position;
    compression braking means for operating said engine in a compression braking mode; and
    bypass control means for detecting actuation of said compression braking mode and for opening said bypass valve in response to detection of compression braking actuation.

2. The turbocompound engine of claim 1, wherein said bypass valve is a variable opening valve for varying the amount of exhaust gas passing through said passage.

3. The turbocompound engine of claim 1, wherein said bypass valve includes first and second valve passages, the first valve passage directing exhaust gas toward said power turbine and the second valve passage directing gas toward said bypass passage, said bypass valve further including a diffuser connected to said second valve passage.

4. The turbocompound engine of claim 1, wherein said bypass valve includes a flapper valve.

5. The turbocompound engine of claim 1, wherein said bypass valve includes poppet valve.

6. The turbocompound engine of claim 1, wherein said bypass valve includes a butterfly valve.

7. The turbocompound engine of claim 1, wherein said bypass valve includes first and second valve passages, the first valve passage directing exhaust gas to said power turbine and the second valve passage directing exhaust gas to said bypass passage, said bypass valve further including diverter means located in said second valve passage for preventing flow of exhaust gas to said bypass passage when the diverter in a first position and for allowing exhaust gas to flow to said bypass passage when the diverter is in a second position.

8. The turbocompound engine of claim 7, further including a diffuser located at an outlet of said second valve passage.

9. The turbocompound engine of claim 8, wherein the power turbine is an axial power turbine, and wherein said bypass valve includes a translating shroud movable between a first position in which flow to the bypass passage is allowed and a second position in which flow to the bypass passage is prevented.

10. The turbocompound engine of claim 1, wherein said compression braking means includes an operator controlled switch of the engine in a compression braking mode; and
    said bypass control means includes means for receiving a signal indicative of said switch operation and for opening said bypass valve in response to said signal.

11. The turbocompound engine of claim 1, wherein said compression braking means includes first operator controlled switch means for producing a signal for actuating operation of compression braking, or second switch means for allowing said signal to actuate compression braking only when a fuel pump of said engine is off, and third switch means for allowing said signal to actuate compression braking only when a clutch of said engine is engaged;
    said bypass control means including means for determining that said first switch means has been actuated, and said second and third switch means have allowed said signal to actuate operation of compression braking means for opening the bypass in response.

12. A turbocompound engine having a power turbine bypass control comprising:
    an internal combustion engine having a crankshaft and an exhaust manifold;
    turbocharger means connected with said intake and exhaust manifolds for converting exhaust gas energy into mechanical energy for boosting intake air pressure, said turbocharger means including a first turbine connected to said exhaust manifold;
    power turbine means for producing mechanical from energy remaining in the exhaust gases exiting said first turbine, said power turbine means coupled to the crankshaft for providing power to the crankshaft;
    compression braking means for operating the engine in a compression braking mode; and
    exhaust pressure relief means for relieving exit pressure of exhaust gas exiting from said first turbine in response to operation of said engine in a compression braking mode.

13. The turbocompound engine of claim 12, wherein said exhaust pressure relief means includes bypass means for allowing of exhaust gas exiting the first turbine to bypass said power turbine.

14. A turbocompound engine having a power turbine bypass control comprising:

an internal combustion engine having a crankshaft, an intake manifold and an exhaust manifold;

turbocharger means connected with said intake manifold and said exhaust manifold for converting exhaust gas energy into mechanical energy for boosting intake air pressure, said turbocharger means including a first turbine having an inlet and an outlet;

a first passage connecting said exhaust manifold to said first turbine inlet;

a second turbine having an inlet and outlet and an output shaft for supplying mechanical power to said engine crankshaft;

a second passage connected to said first turbine outlet;

a third passage connected to said second turbine outlet;

compression brake means for converting said internal combustion engine into an air compressor in response to a control signal;

braking control means for producing said braking control signal;

a fourth passage connecting said second and said third passage;

a bypass valve for moving between an open position in which exhaust gas is allowed to pass through said fourth passage and a closed position in which exhaust gas is prevented from flowing through said fourth passage;

bypass control means connected with said braking control means for moving said bypass valve to its open position upon receipt of said braking control signal.

* * * * *